United States Patent [19]

Stoy

[11] 4,107,121

[45] Aug. 15, 1978

[54] IONOGENIC HYDROPHILIC WATER-INSOLUBLE GELS FROM PARTIALLY HYDROLYZED ACRYLONITRILE POLYMERS AND COPOLYMERS, AND A METHOD OF MANUFACTURING SAME

[75] Inventor: Vladimir Stoy, Prague, Czechoslovakia

[73] Assignee: Ceskoslovenska akademie ved, Czechoslovakia

[21] Appl. No.: 633,786

[22] Filed: Nov. 20, 1975

[30] Foreign Application Priority Data

Nov. 25, 1974 [CS] Czechoslovakia ................... 8051-74

[51] Int. Cl.$^2$ ............................................ C08L 33/20
[52] U.S. Cl. ................... 260/29.6 AB; 260/29.6 AN; 260/29.6 HN; 260/29.6 MQ; 260/29.6 MN; 264/182; 351/160; 526/23
[58] Field of Search ............... 260/29.6 AN, 29.6 AB, 260/29.6 E, 29.6 HN, 29.6 Z, 29.6 AT, 29.6 M, 29.6 CM, 29.6 MQ, 29.6 MN; 528/487, 488; 264/182; 526/23

[56] References Cited

U.S. PATENT DOCUMENTS

| | | | |
|---|---|---|---|
| 2,716,093 | 8/1955 | McClellan | 260/29.6 AB |
| 2,812,317 | 11/1957 | Barrett | 260/29.6 AN |
| 3,812,071 | 5/1974 | Stoy | 260/29.6 AB |
| 3,897,382 | 7/1975 | Stoy et al. | 260/29.6 AN |

*Primary Examiner*—Lorenzo B. Hayes

[57] ABSTRACT

The invention relates to new ionogenic hydrogels based on partially hydrolyzed polymers containing, in the starting material, at least 60, advantageously at least 80% (mol.) of acrylonitrile units, said hydrogels being characterized by a weakly ampholytic, character and by a multiblock structure of polymeric chains with continuous sequences of acrylonitrile units in an amount of from 2 to 95% (molar), alternating with continuous sequences of hydrophylic units consisting of a major amount of acrylic acid and a minor amount of acrylamide units, the sequences or blocks of acrylonitrile units forming together polyacrylonitrile domains detectable by X-ray analysis. In water-swelled condition the hydrogels consist of two distinct but inseparable phases, one of them said polyacrylonitrile, the other said amorphous hydrophilic, highly solvated chains with predominating acrylic acid units. Each macromolecular chain, containing, in average, several blocks or sequences of the said two sorts, (non-hydrolyzed polyacrylonitrile and hydrolyzed to acrylic acid and acrylamide units), takes part of several domains of the two phases. This structure is uniform and homogeneous in the whole cross-section of any article manufactured from the hydrogel.

5 Claims, No Drawings

IONOGENIC HYDROPHILIC WATER-INSOLUBLE GELS FROM PARTIALLY HYDROLYZED ACRYLONITRILE POLYMERS AND COPOLYMERS, AND A METHOD OF MANUFACTURING SAME

The new hydrogels are either non-crosslinked or crosslinked by crosslinks formed by side-reactions of nitrile groups with strong bases; This kind of crosslinking can be either supplemented or replaced by usual covalent crosslinking, or also by ionic crosslinking, using polyvalent cations as crosslinking agents.

The hydrogels of the invention are noted for their extraordinary strength, inertness in contact with having tissues, permeability for gases and solutes as well as for their electrochemical characteristics. They are therefore utilizable in surgery, in density and in various fields of chemical technology.

The preferred method of manufacturing the above defined kind of hydrogels consists in subjecting acrylonitrile-containing polymers or copolymers with at least 80% of acrylonitrile units to a homogeneous controlled partial alkaline hydrolysis in solutions of said polymers in aqueous or lower alcoholic solutions of lithium, sodium or calcium rhodanides, using strong inorganic or organic bases as alkaline catalysts or hydrolytic agents. The hydrolysis can be carried out at any temperature between the melting and boiling point of the solution, usually between about $-15°$ and $+130°$ C, preferably between about $0°$ and $+25°$ C.

BACKGROUND OF THE INVENTION

The alkaline hydrolysis of polyacrylonitrile is well known, it was, however, usually carried out in heterogeneous systems using as starting material undissolved, either non-swelled or only slightly swelled polyacrylonitrile in bulk—e.g. sheets—or in the form of a powder. The alkaline hydrolysis of polyacrylonitrile takes place at a comparatively high rate so that solid polymer is hydrolyzed gradually, layer by layer. If the alkaline hydrolysis or saponification was performed thoroughly, the product consisted almost entirely of the corresponding salt of polyacrylic acid. More often, however, the product was a varied mixture of copolymers of acrylic acid with acrylonitrile, containing moreover various cyclic and crosslinked components, particularly if the starting polymer was high-molecular. Chemical composition ranged from almost intact polyacrylonitrile to almost pure polyacrylic acid, depending also on the molecular weight, the size of the particles of the starting polymer etc. Such heterogeneous hydrolysis never resulted in homogeneous gels of the above defined structure. As the hydrolyzates contained usually units of acrylic acid in a predominating amount, it was often supposed that the alkaline hydrolysis is a pure saponification where nitrile groups are immediately transformed to carboxylic ones, the step characteristic for acid hydrolysis leading to amide group being avoided. In the practice, only low-molecular polyacrylonitrile was used for the alkaline hydrolysis, yielding water-soluble products which are utilized as textile sizes, antistatic preparations in the manufacture of synthetic fibres etc.

On the other hand it is known that homogeneous acid hydrolysis of polyacrylonitrile or its copolymers with at least 80% of acrylonitrile units can be controlled in such a way that a multi-block copolymer with high strength and elasticity is formed as a result of the prevailing "zipper-like" step of the hydrolysis. Said multi-block copolymers contained, in addition to intact polyacrylonitrile sequences, comparatively long sequences consisting almost entirely of acrylamide units. Only at high conversions, and particularly at high temperatures of the hydrolysis, the hydrophilic segments contain also some units of acrylic acid and diacryl imide. It has been suggested to increase the portion of acid units therein by additional alkaline hydrolysis or by a treatment with nitrous acid, but most of the amide groups remained intact due to steric hindrances and the end products were different both qualitatively and quantitatively from the hydrogels of the present invention.

GENERAL DISCLOSURE

Alkaline hydrolysis of predominantly acrylonitrile containing polymers in homogeneous phase where the solvent or swelling agent is an aqueous or alcoholic solution of lithium, sodium or calcium rhodanides or of mixtures thereof, containing, if desired, minor amounts of other salts causing no coagulation, leads to ionogenic multi-block hydrophilic copolymers of a new class. In comparison with the known multi-block copolymers obtained by homogeneous acic hydrolysis of predominantly acrylonitrile containing polymers the new hydrogels contain in their hydrolyzed segments a major portion of acrylic acid units and a minor, but not negligible portion of acrylamide units. As a result, the new hydrogels are, in neutralized condition, more swellable at the same conversion of hydrolysis, or stronger than the known acid-hydrolyzed copolymers with the same content of water at swelling equilibrium, containing, in average, longer sequences of acrylonitrile units and thus larger polyacrylonitrile domains which are responsible for the strength of the hydrogel.

Further advantage of the present ionogenic hydrogels is the absence of diacryl imide groups which are suspected to hold some cations rather firmly so that the latter cannot be easily removed by washing. The behavior of weak cation exchanger, due to the presence of many carboxylic side groups, as well as the slightly ampholytic characteristics caused by weakly basic groups formed by side-reactions of nitrile groups, confer to the new hydrogels interesting electro-chemical properties.

The formation of the multi-block structure by the alkaline hydrolysis is surprising and cannot be derived from the known acid hydrolysis which possesses an entirely different reaction mechanizm.

Thus, the object of the invention is a new class of ionogenic water-insoluble hydrogels, characterized by a multi-block structure with two distinct but inseparable phases, one of them being amorphous and strongly hydrophilic, consisting mainly of a major portion of acrylic acid units and of a minor portion of acrylamide units, the other phase consisting substantially of crystalline or quasi-crystalline polyacrylonitrile detectable by usual X-ray analysis, and further characterized by a minor amount of weakly basic nitrogeneous groups and from 0 to about 5% (mol.) of crosslinks derived from transformed nitrile groups, said crosslinks being unstable in presence of free bases but stable, at mild temperatures, in neutral and acid media, and further containing, if desired, covalent crosslinks formed subsequently, or ionic crosslinks, each polymer chain containing, in average, more than one block or sequence of polyacrylonitrile and more than one block or sequence of the said products of hydrolysis, taking therefore part of more than one domain of each of the two phases, said multi-block structure being uniform and homogeneous throughout the whole cross-section of any molded or cast article, provided that the article has not been subjected to further surface treatment.

Another object of the invention is a method of manufacturing the above defined ionic hydrogels by subjecting a polymer containing at least 60%, preferably at least 80% of acrylonitrile units, to a homogeneous alkaline hydrolysis in presence of aqueous or alcoholic solutions of rhodanides selected from the group consisting of sodium, lithium and calcium rhodanides and their mixtures, if desired in presence of other salts or substances incapable to coagulate the polymer in the amount added, and in presence of a suitable base capable of causing the hydrolysis. The term "homogeneous alkaline hydrolysis" means that the polymeric substance is either dissolved to a homogeneous solution or swelled to a homogeneous gel during the whole reaction except the short intervals where the base is added and removed. Thus, the above mentioned rhodanide solutions acts as solvents for both starting non-hydrolyzed polymer and the resulting hydrolyzate.

In order to keep the reaction mixture homogeneous, the base is to be added in a non-coagulating form, preferably in a solution of rhodanides of the above mentioned kind, dissolving polyacrylonitrile.

The dissolution of the starting acrylonitrile polymer or copolymer in aqueous or lower-alcoholic solutions can be facilitated by preparing first a dispersion of the polymer either in water or in a rhodanide solution of such a decreased concentration that it is not yet soluble therein, and then adding rhodanide in solid form or in form of a saturated solution under stirring until the dispersion is transformed to a viscous solution.

Another way how to facilitate the dissolution of the polymer is to prepare first a dispersion in sufficiently concentrated rhodanide solution at such a decreased temperature that the dissolution is first suppressed, whereafter the temperature is increased while stirring until the dispersion in changed to a solution.

It is advantageous to use, as starting material, a copolymer of acrylonitrile with a small amount of either acrylic acid or acrylamide, or a mixture thereof, preferably less than 5% (mol.). Thereby the zipper-like hydrolysis step is supported, each carboxylic or amidic group forming a nucleus from which the hydrolysis proceeds comparatively rapidly along the polyacrylonitrile chain. Said co-monomers can be replaced by such capable of liberating carboxylic or amidic groups during the reaction, e.g. acrylic or methacrylic esters or substituted amides, the acyl or alkyl group of which is easily split off in presence of bases. As the said effect is due to free carboxylic and amidic groups, acrylic acid can be replaced by other polymerizable carboxylic acids such as methacrylic or itaconic acid or maleine anhydride. The lower the amount of initial carboxylic or amidic group, the longer are the blocks or sequences in the resulting multi-block copolymer.

Homogeneous alkaline hydrolysis of acrylonitrile polymers is accompagnied by side-reactions on the nitrile groups causing formation of weakly basic groups and covalent cross-links which are, however, unstable in presence of bases so that their number first increases and later on, after having reached a maximum, decreases again. Said side-reactions are accompagnied by discoloration to yellow, orange, red and brown. In accordance with chosen conditions, either soluble or insoluble hydrogels can be obtained. Among said conditions, the sort and the concentration of the base, the concentration of the polymer solution, the time and temperature of hydrolysis are the most important.

The reaction mechanizm of the said side-reactions is rather complicated and is not yet fully explained. Probaly, the products of alkaline hydrolysis of acrylonitrile polymers contain, in addition to nitrile, carboxylic and amidic side groups, at least one of the following groups:

Tetrahydronaphtyridines, resulting from the reaction

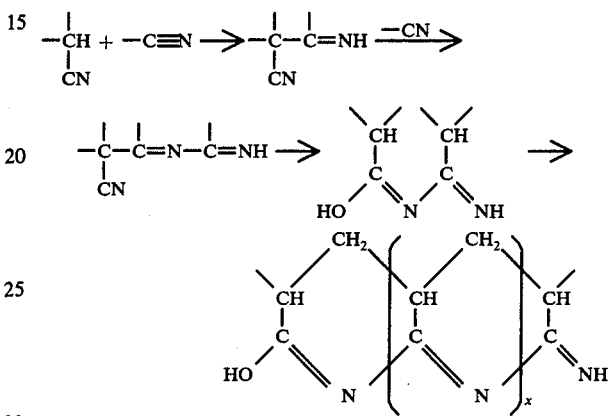

Further groups present in the hydrolyzates are probably

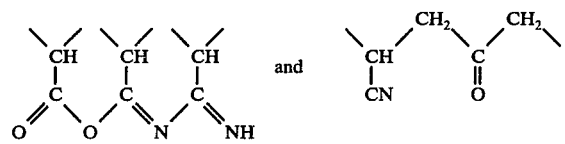

Free valences in the above formulae can be connected either with the valences of the same macromolecule, or with those of another macromolecule, resulting either in cyclization to six-membered rings or in intermolecular crosslinking, preceded by branching.

The density of crosslinking can be controlled in various ways:

(1) Changing the polymer concentration of the solution. At low polymer concentrations the intramolecular cyclization is preferred, while high polymer concentration supports intermolecular crosslinking.

(2) It has been established that the crosslinking is time-dependent because of two concurrent reactions: Formation of crosslinks (which takes place at a higher rate) and a slower splitting of crosslinks. Thus, the degree of branching and crosslinking as well as that of polymerization first increases, reaches a maximum and then decreases approximately to the original value. Thus, the desired degree of crosslinking can be obtained by interrupting the hydrolysis at a chosen moment. It is clear that any degree of crosslinking can be reached at two different degrees of hydrolysis, one before and the other after said maximum.

(3) By changing the concentration of the base and temperature. All concurrent reactions possess different activation energies so that any of them can be supported by choosing suitable conditions. For instance increased temperature shifts the maximum of crosslinking towards longer degrees of hydrolysis. By decreasing the concentration of the base (or by using a weaker base), the maximum of crosslinking is lowered.

(4) By choosing an appropriate degree of polymerization and chemical composition of the starting polymer. It has been found that the maximum of crosslinking is lowered, at equal conditions, by decreasing the degree of polymerization. Moreover, it was found the maximum of crosslinking is lowered and simultaneously shifted towards lower conversions of hydrolysis, if using a copolymer of acrylonitrile with a small amount of a monomer with a carboxylic or amide side-group, either free or protected as disclosed above. In addition to the above mentioned monomers further co-monomers as e.g. citraconic, mesaconic, aconitic and fumaric acid can be stated, as well as isobutyl acrylate or N-isobutyl amide and similar.

Irrespective of the real mechanism of hydrolytic, crosslinking, oxidative and splitting reactions, the main advantage of the method of the invention is the possibility of obtaining, in one step, products with various swelling capacities, degrees of hydrolysis and crosslinking by changing the reaction conditions of the same starting material. This advantage cannot be gained in the known processes.

As stated above, polymers containing at least 60%, preferably at least 80% of acrylontrile units can be used as starting material. In addition to active co-monomers mentioned above, supporting the zipper-like hydrolysis, any co-monomers copolymerizing with acrylonitrile can be used, if desired. Such inert comonomers do not usually amend the properties of the resulting hydrogels, often decreasing their physical characteristics.

As examples, following dispensable co-monomers can be mentioned: Methacrylonitrile, Allylamide, alpha-methylene glutaramide, allyl alcohol, acrylates and methacrylates of glycols and other polyols, as well as their alkoxy derivatives, with 1 to 6 carbon atoms in the alkyl group; Glycidyl acrylate and methacrylate; Various esters and amides of alpha, beta-unsaturated carboxylic acids such as alkyl esters $C_1$–$C_8$, benzyl, cyclohexyl, aminoethyl, N-alkyl- and N,N-dialkylaminoethyl esters, N-alkyl and N,N-dialkyl amides and their hydroxy derivatives, halides and hydrazides; unsaturated sulfonic acids such as ethylene, allyl, methallyl and styrene sulfonic acids and their salts and esters respectively; unsaturated ketones such as methyl vinyl ketone, phenyl vinyl ketone and vinyl isopropenyl ketone; Vinyl esters such as vinyl formiate, acetate propionate, butyrate and benzoate; N-alkylameine imide;N-vinyl carbazole and N-vinyl succinimide;N-vinyl phthalimide;Vinyl ethers, particularly alkyl vinyl ethers $C_1$–$C_6$; 4-vinyl pyridine and 2-vinyl pyridine, 2-ethyl-5-vinyl pyridine; Vinyl pyrrolidone; Styrene and its alkyl derivatives; vinyl chloride, vinylidene chloride, vinylidene cyanide, butadiene, chloroprene, isoprene, ethylene, propylene and siloxanes, as far as all above listed monomers are copolymerizable with acrylonitrile.

Subsequent crosslinking of the hydrogels of the invention can be carried out using at least bifunctional substances capable of reacting with the side groups of the copolymer; In anhydrous solutions of the copolymer a di-epoxide or a di- or tri-isocyanate can be used. A suitable solvent is, in this case, e.g. dimethyl sulfoxide, suitable crosslinking agents are e.g. hexamethylene diisocyanate or toluylene triisocyanate. Carbon dioxide liberated during the crosslinking can be used in a known way to prepare foamed hydrogels, which are suitable, after thorough washing, for drugs-carrying implants, filter materials or material for dialysis.

For ionic crosslinking, stable in acid and neutral media, polyvalent cations forming stable salts with the copolymer can be used, particularly trivalent cations of chromium, aluminum and iron. Another type of crosslinking is complexing with monovalent silver or copper cations; Less stable complexes are formed also with heavy metal cations such as gold or palladium. Ionic and complex-forming crosslinking can be rather easily split by treating with alkaline materials (in case of trivalent cations) or with soluble halides and other substances. The forming of insoluble salts and complexes is accompagnied by de-swelling, the splitting of the crosslinks by swelling. It is possible to utilize said phenomena in printing industry.

Although water is usually preferred as solvent of rhodanides, lower aliphatic alcohols such as methanol or ethanol or isopropenyl alcohol possess certain advantages, especially the possibility of removing undesired water-soluble but alcohol-insoluble admixtures such as polyacrylic acid, if present. Methanol or ethanol are also capable to decrease the viscosity of aqueous rhodanide-polymer solutions and can be thus used as diluents. If methanol or another lower aliphatic alcohol is used instead of water, the base can be added as alcoholate, e.g. as sodium methylate.

The conversion of hydrolysis can be chosen in a broad range from about 3 to about 97% of reacted nitrile groups. The swelling capacity, depending on both the hydrolysis and crosslinking, can vary from about 5 to about 98% (wt.) of water at swelling equilibrium.

The concentration of the rhodanide in water or methanol can vary from about 30% (wt.) to saturation, ranging usually from 50 to 80 % of the concentration of the saturated solution.

The concentration of the polymer in the rhodanide solution lies usually within 2 to 50% (wt.), and that of the base ranges from about 0.05 to about 7.5% (Wt.), related to the solution as a whole.

Most suitable bases are alkali metal hydroxides and carbonates, aquous ammonium hydroxide, and strong nitrogen bases such as dimethyl amine and similar. Strongly basic anion exchangers in soluble form can be also used. If commercial insoluble anion exchangers are used as basic catalysts, it is possible to remove them by filtration without neutralizing them.

After having reached the desired degree of hydrolysis and crosslinking, the reactions are interrupted by either removing or neutralizing the base. This can be achieved most suitably by washing, whereby the rhodanides are also removed and the polymer gets coagulated. Acid neutralizing agents can be added to the washing liquid. The coagulation and neutralization can be connected with shaping or molding to foils, sheets, filaments, tubes, rods, plates, profiles, grains etc. The coagulation in water is easy, the surface of the coagulated gel is smooth and free of heterogenities. Another method of shaping is molding in open or closed molds. The mixture of the polymer solution with the base is poured into a mold, where the hydrolysis and crosslinking takes place. In comparision with polymerization casting the method possesses the advantage that there is no contraction by polymerization. It is only necessary to take into account the subsequent shrinkage or swelling after washing in water, according to the degree of the hydrolysis. The change of volume caused by the reaction heat is negligible.

Polymer solutions can be, if desired, prepared also by polymerization or copolymerization of acrylonitrile in aqueous rhodanide solutions, particularly if lower molecular weights are desirable.

The hydrogels can be also worked by extrusion of their rhodanide-containing solutions into a coagulating bath, containing an acid such as acetic, phosphoric, sulfuric or hydrochloric acid. As the hydrolysis takes place at a sufficiently high rate, it is possible to extrude the polymer solutions during the reaction and to obtain crosslinked products. This can be achieved by adding the base immediately before the working, e.g. directly into the mixer of the extruder. The rate of extrusion is such that the crosslinking occurs prior to coagulation. To achieve this, it is advisable to extend the period of time between extrusion and coagulation, e.g. by interposing a bath of an inert liquid such as oil, immiscible with the extruded rhodanide solution. The oil bath can be held on a sufficiently high temperature to accelerate the hydrolysis. The inert bath can be replaced by an endless conveyor or by a sufficiently long air gap, if desired. This method is made possible by the comparatively high rate of all concurrent reactions.

Ready made hydrogels of the invention in non-crosslinked state can be worked using methods of working thermoplastics, e.g. by molding, pressure and injection molding, calendering, etc., preferably in swelled condition at temperatures above 70° C. There is no need to add polyacrylonitrile solvents such as sodium rhodanide or dimethyl sulfoxide, it is, however, possible to use also other swelling agents than water, e.g. glycerol or its diacetate.

The degree of crosslinking can be estimated by observing the color of the reaction of mixture, turning first to yellow, then to orange, red and brown. The crosslinking reaches a peak when the shade is deep reddish brown; Then, the color changes in opposite succession, the density of crosslinking decreasing simultaneously. This makes possible to interrupt the reaction in the right moment to obtain the desired crosslinking density.

The coloration is not stable and decreases slowly after the coagulation, without changing, however, the density of crosslinks markedly. The decolorizing can be accelerated by treating the hydrogel with diluted acids such as with sulfuric, nitric, hydrochloric, phosphoric, perchloric, acetic, fluoroacetic, chloroacetic, formic or toluene sulfonic acids. Strong inorganic acids have to be used in concentrations lower than 20 %. The acid treatment can be combined, if desired, with the above mentioned neutralizing of the base. The finished hydrogels are usually slightly yellowish.

In addition to the above mentioned high strength and elasticity the hydrogels of the invention are noted for their high charge density, and thus for good conductivity and anistatic character. The transfer of charge is probably enhanced by conjugated groups. The charge density causes probably also high slipperiness of the hydrogel surface.

Carboxylic, amidic and nitrilic groups are rather reactive, making possible further modification such as chemical binding of dyestuffs, drugs, enzymes and other biologically active substances. The new hydrogels are therefore suitable for manufacturing surgical instruments such as catheters, sounds, sewing material and other special filaments, implants, carriers of drugs such as bactericides, antibiotics, fungicides, bacteriostatics and cytostatics. Instead of being bound by covalent bonds, the biologically active substances can be attached to the polymer by ionic, co-ordinative or sorption forces.

The hydrogels of the invention can be utilized also as weakly acidic cation exchangers, preferably in the form of membranes, partitions, tubes, hollow filaments and similar. Another field of their use are molecular sieves, catalyst carriers, membranes for reverse osmosis, dialysis, diaphragmes and filtering material, i.e. in all cases where high strength in connection with high permeability and swelling capacity, as well as other above mentioned properties are required, e.g. tolerability with living tissues, wettability or high charge density.

PREFERRED EMBODIMENT

The preferred method of manufacture is simple, consisting in dissolving either pure polyacrylonitrile or a copolymer of acrylonitrile with a very small amount, preferably not more than 2%, of a comonomer capable of starting the zipper hydrolysis, such as acrylic acid, in an aqueous sodium or calcium rhodanide solution, adding a solution of a strong base, preferably sodium hydroxide, in an aqueous solution of the same rhodanide, homogenizing the mixture and leaving it standing at ambient temperature until the desired degree of hydrolysis as well as that of crosslinking is achieved. The temperature and time can be varied along the above explained lines. The more or less colored viscous solution or gel is then washed in acidified water, preferably counter-currently so that the most concentrated solution can be worked to recover the rhodanide in usual manner.

The coagulation is preferably connected with shaping to either a half-product or a final product, the latter being then molded by heat and pressure like any other thermoplastic.

The stirring and mixing of polymer solutions is preferably carried out in such a way that no gas bubbles are stirred in, e.g. under reduced pressure or in an entirely filled up flask or reactor. If a gaseous base such as dimethyl or trimethyl amine is used, it dissolves readily without leaving gas bubbles.

If the polymer was solved in the above described manner, i.e. by preparing first a dispersion in water or in a diluted rhodanide solution and by adding thereto solid rhodanide while stirring rapidly, the homogeneous solution is gained in a very short period of time.

A diluted acid bath reduces the discoloration to a fully transparent yellowish shade.

EXAMPLES

The invention is further explained by following non-limitative Examples, wherein all parts and percentages are meant by weight if not stated otherwise.

EXAMPLE 1

A 60% aqueous sodium rhodanide solution was divided to two portions. One portion was cooled down to 5 ° C and powdered polyacrylonitrile with average molecular weight of 110 000 (prepared previously by usual precipitation polymerization in water), was stirred in. As soon as the ambient temperature was reached and the solution became fully homogeneous and clear, a sodium hydroxide solution in the other portion of the rhodanide solution was added while stirring. The whole procedure was carried out under reduced pressure. The resulting solution contained 7.34% of the polymer, 0.92% of sodium hydroxide and 55.04% of sodium rhodanide in water.

The solution was sucked into a large spinning pipette with a 1 mm opening. In intervals stated below a portion of the solution was spun into an excess of water, and another portion extruded onto a Petri-dish laying in horizontal position; The uniformly spread solution was then coagulated by water.

After 2 hours at 20° C there was obtained a colorless filament containing in swelled condition 5.5% of water (while non-hydrolyzed polyacrylonitrile contains not more than about 1%), could be easily colored with basic dyestuffs and had good tensile strength and elongation.

After 24 hours at 20° C the solution was highly viscous and deeply red. Both filament and membrane, prepared in the above mentioned way, contained slightly more than 50% of water at swelling equilibrium and were colored orange. The samples were immersed for 2 hours in 10% sulfuric acid, then washed in water, neutralized in a 1% sodium hydrocarbonated solution in water and finally washed again in an excess of water. The samples kept their physico-mechanical characteristics, only the color became slightly yellowish.

The hydrogel was unusually strong and could be molded in swelled condition at about 100° C. After 100 hours at 20° C the polymer solution was about as fluid as at the start, light yellow, and coagulated to a hydrogel containing, at swelling equilibrium, 88% of water. The hydrogel was transparent, highly elastic, slippery and still fairly strong.

EXAMPLE 2

The polyacrylonitrile solution prepared according to Example 1, with sodium hydroxide added, was kept at 50° C. After 2 hours the polymer was dark brown and markedly crosslinked. A coagulated sample was very strong and contained 45% of water. When treated with 80% acetic acid, the hydrogel turned yellow.

After 48 hours at 50 ° C the solution was fluid, orange-colored and contained, when thoroughly washed in water, more than 70% of water. The strength was still comparatively high.

After 75 hours at 50 ° C, the viscosity of the solution decreased again to original value. The solution was yellow. The water-insoluble coagulate contained more than 90% of water at swelling equilibrium.

EXAMPLE 3

Polyacrylonitrile with an average molecular weight of 88 000 was dissolved in an aqueous lithium rhodanide solution and a lithium hyroxide solution in equal rhodanide solution was added while stirring in an entirely filled up flask. The solution contained 18% of polyacrylonitrile, 6% of lithium hydroxide and 52% of lithium rhodanide in water. The solution was cast into a paraffin mold in the form of a concave-convex lens. After 10 minutes the filled mold was immersed into paraffin oil heated to 100° C. The mold melted, leaving a dark red lens, turning rapidly to a lighter shade. As soon as the lens obtained an orange-yellow color, it was taken out and laid into 5% sulfuric acid. After 24 hours the now almost colorless lens was washed in water and left standing in a 0.9% sodium hydrocarbonate solution in water.

The contact lens thus obtained contained 76% of the solution, was slippery, sufficiently strong and shape-retaining. Its contact with the cornea was non-irritating.

EXAMPLE 5

A copolymer of acrylonitrile with 10% of acrylic acid, prepared by usual precipitation-polymerization in water, with an average molecular weight about 1,000,000, was dispersed in water at 50° C and solid powdered sodium rhodanide was added while stirring as rapidly as it dissolved. When the rhodanide concentration reached about 45%, the copolymer dissolved and the viscosity increased abruptly. The solution contained 4.3% of the copolymer, 55% of sodium rhodanide, the remainder to 100% being water. To this solution another rhodanide solution with dissolved potassium carbonate was added in such an amount that the resulting solution consisted of 4.2% of polyacrylonitrile, 0.1% of potassium carbonate and 58% of sodium rhodanide in water. The homogenized solution was heated 16 hours to 90° C. During this period of time the solution got first thicker and turned brown. Later on, the viscosity decreased again and the color was yellow. The solution was mixed with dried and ground lucerne (alfalfa) in a ratio 1:5, related to dry substance of the polymer solution. The thoroughly kneaded pastry mixture was extruded through a sieve into water wherein it coagulated to a granulated mass. The matter was left standing for 24 hours in a 3% aqueous formaldehyde solution, the excess of which was then left to drip off. The material was then dried at 105° C, whereby the finder got crosslinked. After new swelling in water the material could be used as sorbent of heavy metals.

Example 5

Acrylonitrile was dissolved in 65% nitric acid and polymerized by means of potassium persulfate. The polymer solution was left standing at 20° C until 31% (molar) of acrylontrile units were hydrolyzed to amide groups and 2% to carboxlyic groups. The multi-block copolymer thus obtained was coagulated in water, neutralized, washed, comminuted and dissolved in an aqueous calcium rhodanide solution, with a concentration of 60% of that of the saturated solution. Gaseous ammoniak was led through the solution which was then kept 72 hours at 40° C. The solution was extruded through a circular nozzle into an aqueous slightly acidified coagulating bath, water being led simultaneously at a slight overpressure through an axial opening in the nozzle. A thin-walled tube with a large diameter was obtained, suitable as a membrane for osmose.

EXAMPLE 6

A terpolymer consisting of 90% acrylonitrile, 6% of maleine anhydride and 4% of 2-hydroxyethyl methacrylate units was dissolved in a 60% aqueous sodium rhodanide solution to a 40% polymer solution. The deaerated solution was mixed in an extruder with another sodium rhodanide solution, containing 58% of the rhodanide, 7% of sodium hydroxide and 35% of water, in a ratio 4:1, at 5° C temperature. The mixture was extruded through a circular nozzle into a 110° C paraffin oil. The hydrolysis and crosslinking process begun already in the extruder so that a highly viscous, dark brown solution left the nozzle. In the heated oil the crosslinking was finished and the strand turned still darker, but after having left the oil bath it was only orange-brown although still sufficiently crosslinked.

By leading hot paraffin oil into the axial opening of the nozzle, an elastic hydrogel tube was obtained which was cut to about 35 long pieces. After a thorough washing the tubes could be used as tracheal sounds. The tubes with high swelling capacity could be imbibed with antibiotics, anaesthetics and other drugs, to achieve atraumatic properties and a long time tolerability, avoiding the danger of a secondary infection.

EXAMPLE 7

The solution from Example 1 was, after having added the base, kept 120 hours at 5° C. Then it was poured into an excess of water, the coagulate washed and molded at 130° C in a closed mold to a mushroom-like prosthesis of a joint head.

EXAMPLE 8

The solution from Example 4 was coagulated after 48 hours at 75° C, washed and redissolved to a 5% solution in a 60% sodium rhodanide solution. The solution was dispersed while stirring in paraffin oil and the dispersion stirred into excess of water. By separating the oil and the diluted rhodanide solution, highly swellable multi-block copolymer in the form of small spheres, similar to a suspension polymer, was obtained. It could be used as a molecular sieve, or as a weakly acidic cation exchanger, or also as a carrier of various biologically active substances.

EXAMPLE 9

A thin-walled tube with 2.5 mm calibre, made according to Example 5, was filled with powdered 1-ascorbic acid and closed in short intervals by means of a pair of pincers heated to 75° C and cut in the welded sections, forming small soft, permeable containers which could be easily gulped down. Their size was 4×4×2 mm when dried. Ascorbic acid was gradually eluated through the swelled wall during its passage through the gastro-intestinal tract. The swelling capacity and permeability was much lower in the acid medium of the stomach than in the alkaline medium of the intestines, and the gradually liberated drug was better utilized than in the usual form of tablets.

EXAMPLE 10

Multiblock-copolymer obtained according to Example 4 and redissolved in neutral rhodanide solution according to Example 8 was brought onto a knitted polyester fabric and the whole was dried at 60° C until the excessive rhodanide crystallized. By washing the rhodanide rapidly in water a thin spongy foil, reinforced by the knitted fabric, was obtained, easily permeable for water and aqueous solutions but impermeable for non-polar liquids such as mineral oils and gasoline. It could be used for filtering waste waters containing mineral oils.

The spongy foil was considerably less easily penetrated by alkaline and neutral water than by acidified one. This behavior can be used e.g. for avoiding alkalies to penetrate into sewage or similar.

The above Examples can be combined and modified within the scope of the invention. Evidently, the hydrogels of the invention can be utilized for many further purposes not mentioned expressively here.

What I claim is:

1. Method of manufacturing ionogenic, water-insoluble, water-swelled polymers of acrylonitrile comprising:
    (a) forming a homogeneous, aqueous rhodanide solution of 2–50 wt%, based on the total solution, of an acrylic polymer containing at least 80% (molar) of acrylonitrile units, together with comonomer units selected from the group consisting of arcylic acid, methacrylic acid, itaconic acid, citraconic acid, mesaconic acid, aconitic acid, fumaric acid, maleic anhydride, acrylamide, isobutyl acrylate and 2-hydroxyethyl methacrylate, said rhodanide being selected from the group consisting of lithium, sodium and calcium rhodanide and mixtures thereof and being present in an amount of 30 wt% to saturation;
    (b) hydrolyzing said homogeneous solution of said polymer, the homogeneity being maintained during the whole reaction, in the presence of 0.05–7.5 wt%, based on the total solution, of a base selected from the group consisting of alkali metal hydroxides and carbonates, ammonium hydroxide, dimethyl amine and trimethyl amine at a temperature of from $-15°$ to $+130°$ C.; and
    (c) recovering the product of hydrolysis, after having reached the desired degree of hydrolysis, by washing out said rhodanide and by washing out and/or neutralizing said base.

2. Method according to claim 1, wherein water, as solvent, is at least partly replaced by a lower aliphatic alcohol with 1–4 carbon atoms.

3. Method according to claim 1 (covered in previous amendment), wherein the hydrolysis is carried out at temperatures ranging 0° to 25° C.

4. Method according to claim 1, wherein the hydrogel is subsequently crosslinked by reaction of said hydrogel in an anhydrous solution in dimethyl sulfoxide with hexamethylene diisocyanate or toluylene triisocyanate 5. A hydrolyzed acrylonitrile-containing polymer produced by the method as defined in claim 1.

* * * * *